Sept. 11, 1934.    N. B. GREEN ET AL    1,973,479
LATCH FOR A RECEPTACLE
Filed May 9, 1932

Inventors:
Newton B. Green
& Carl C. Fuerst,
By
Newton M. Perrins
George A. Gillette, Jr.
Attorneys Patented Sept. 11, 1934

1,973,479

UNITED STATES PATENT OFFICE 1,973,479

LATCH FOR A RECEPTACLE

Newton B. Green and Carl C. Fuerst, Rochester, N. Y., assignors to Eastman Kodak Company, Rochester, N. Y., a corporation of New York Application May 9, 1932, Serial No. 610,278

4 Claims. (Cl. 206—1)

The present invention relates to a latch for a receptacle and more particularly to a latch which is located within one of the connections for attaching a handle to the receptacle.

The primary object of the present invention is the provision of a locking means within a connection of the handle for a receptacle.

Another object of the present invention is the provision of a locking means for the separable parts of a camera, said locking means being located within one of the studs for attaching a handle to the camera.

A further object of the present invention is the provision of a locking means in the forward stud for the handle of a camera, said locking means being biased to or normally held in an extended position for engagement with a recess in the roll-holder of a camera.

Still another object of the present invention is the provision of a locking bolt slidably mounted in one of the studs for the handle on a camera, said locking bolt being normally held in an extended position and being adapted for movement into a retracted position by a cam surface on the roll holder of the camera.

Other and further objects of the present invention will be suggested to those skilled in the art as the description of our invention proceeds hereinafter.

The aforementioned and other objects of the invention are embodied within a receptacle having a handle attached thereto by a pair of connections and having a locking means which is located within one of the connections for attaching the handle to the receptacle.

Reference is hereby made to the accompanying drawing in which like reference numerals designate similar elements, and in which.

Figure 1:
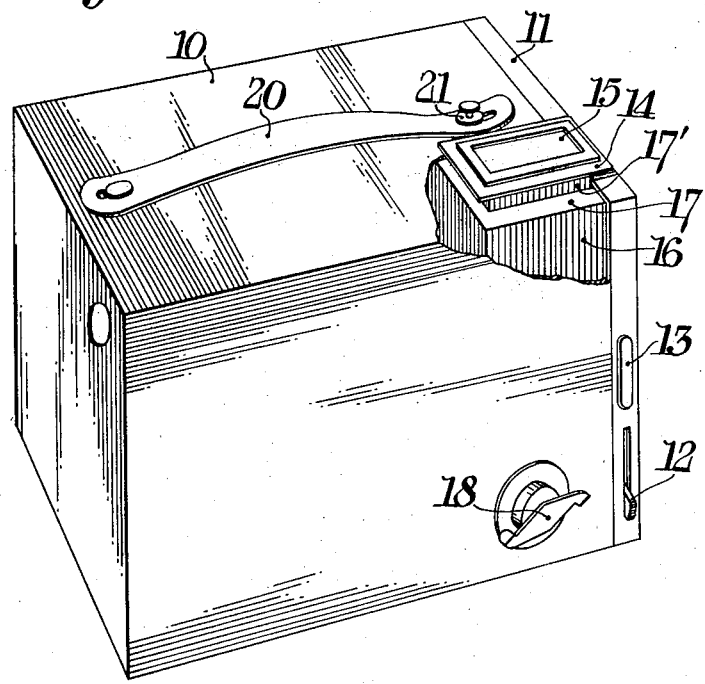
Fig. 1 is a perspective view of a box-type camera having a locking means provided in the forward stud for the handle according to the present invention.
Figure 2:
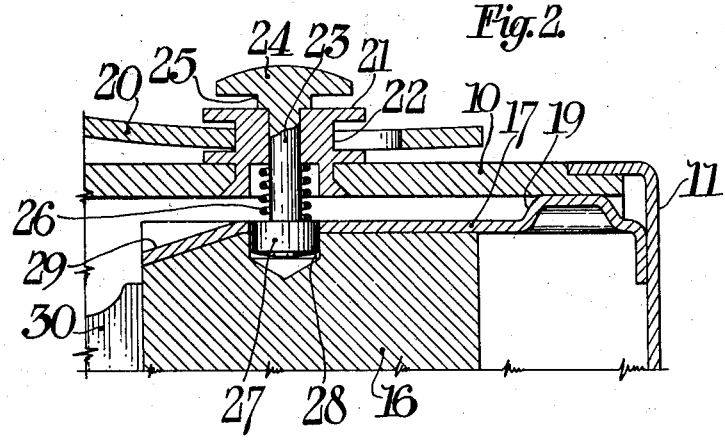
Fig. 2 is an enlarged, vertical and longitudinal cross-section of the upper front portion of the camera shown in Fig. 1.

While the invention has been illustrated as applied to a box-type camera, it is well understood that it may be readily adapted for use on any type of receptacle having separable parts which are fastened together by a locking means. The separable parts may be detachable or hinged with respect to each other.

In the illustrated embodiment of the invention, the receptacle is a camera having a camera body 10 and a front plate 11 which carries the usual shutter trip 12 and which is provided with embossing 13 for withdrawing the front plate 11 from the camera body 10. A frame 14 is integral with the front plate 11 and supports the glass 15 of the finder. The remainder of the finder is located in the lens block 16 attached to the camera front 11 and flanges 17' are struck up from plate 17 which is attached to the top of lens block 16 in order to space frame 14 the proper distance from lens block 16. The camera casing 10 is recessed to receive the flanges 17', the edges of the recess lying under the frame 14. The winding key 18, of known construction, is mounted on the side of camera body 10. A transverse embossing 19 is impressed in plate 17 in spaced relation to the edge of camera front 11 so that the edges of camera body 10 are guided into light tight contact with the camera front 11 when the parts 10 and 11 are telescoped with respect to each other.

A handle 20 is attached at each end to the camera body 10 by suitable connections. The connections as illustrated may comprise a stud 21 which is provided with a restricted portion 22 for attachment to the ends of handle 20. The locking means for the separable parts of the receptacle is located within one of the connections for the handle and is specifically illustrated as comprising a locking bolt 23 having a head 24 which is provided with a shoulder portion 25, said locking bolt 23 being slidably mounted within stud 21. A coil spring 26 encircles bolt 23 between the tip 27 of bolt 23 and stud 21. As a result, the locking bolt is biased to or normally held in an extended position in which shoulder portion 25 abuts the top of stud 21 with head 24 in spaced relation to the top of stud 21. The spacing between head 24 and stud 21 permits the operator to insert his fingernails between head 24 and stud 21 to raise bolt 23. The lens block 16 and plate 17 are drilled to form a recess 28 into which the locking bolt 23 and tip 27 may extend in extended position of the locking bolt, thus securely fastening the two separable parts together. The lens block 16 and plate 17 are also recessed and bent to form a cam surface 29 which is adjacent the recess 28.

When the camera roll holder 30, including lens block 16 and plate 17, is inserted into camera body 10, the tip 27 of locking bolt 23 will engage cam surface 29 and locking bolt 23 will be raised against the action of coil spring 26 into a retracted position by the camming action of surface 29 on tip 27. When the roll-holder has been properly inserted into camera body 10, and camera front 11 is properly located with respect to camera body 10, then tip 27 and locking bolt 23 will be sprung into recess 28 under the action of coil spring 26 and the camera parts will be maintained in this relation by the locking means. When it is desired to separate the camera parts, locking bolt 23 and tip 27 may be manually moved into retracted position by the operator and the camera parts may be displaced with respect to each other.

Since many modifications of the present invention may be effected without exceeding the scope of our invention the present disclosure is to be considered in an illustrative and not in a limiting sense.

Having now particularly described our invention what we desire to secure by Letters Patent of the United States and what we claim is:

1. A photographic camera comprising a casing, a stud on said casing and provided externally with a groove, a locking bolt slidably mounted in said stud, and a flexible carrying handle provided with an opening for detachable connection to said stud at said groove.

2. A photographic camera comprising a casing, a stud on said casing and provided externally with a groove, a locking bolt slidably mounted in said stud, and a flexible carrying handle provided at one end with an elongated opening for detachable and loose connection to said stud and within said groove.

3. A photographic camera comprising a casing, a stud on said casing and provided with an external groove, with an axial hole, and with an axial recess in one end of said stud, a locking bolt slidable within said axial hole, including an enlarged portion at one end and a head at the other end, a coil spring encircling said bolt with one end within said recess and the other end against said enlarged portion, and a flexible handle which is provided at one end with an elongated opening for loose detachable connection to said stud within said groove.

4. A photographic camera comprising a casing, a stud on said casing and provided with an external groove, with an axial hole, and with an axial recess in one end of said stud, a locking bolt slidable within said axial hole, including an enlarged portion at one end and including at the other end a head and a shoulder for spacing said head from the other end of said stud, a coil spring encircling said bolt with one end within said recess and the other end against said enlarged portion and for normally holding said shoulder against said other end of said stud, and a flexible handle which is provided at one end with an elongated opening for loose detachable connection to said stud within said groove.

NEWTON B. GREEN.
CARL C. FUERST.